US009586497B2

(12) United States Patent
Epstein et al.

(10) Patent No.: US 9,586,497 B2
(45) Date of Patent: Mar. 7, 2017

(54) ELECTRIC VEHICLE RECHARGING STATION INCLUDING A BATTERY BANK

(71) Applicant: Lightening Energy, Dover, NJ (US)

(72) Inventors: Michael L. Epstein, Bedminster, NJ (US); Christopher K. Dyer, Madison, NJ (US)

(73) Assignee: Lightening Energy, Dover, NJ (US)

( * ) Notice: Subject to any disclaimer, the term of this patent is extended or adjusted under 35 U.S.C. 154(b) by 391 days.

(21) Appl. No.: 14/092,401

(22) Filed: Nov. 27, 2013

(65) Prior Publication Data

US 2015/0054460 A1   Feb. 26, 2015

Related U.S. Application Data

(60) Provisional application No. 61/868,719, filed on Aug. 22, 2013.

(51) Int. Cl.
  *B60L 11/18*   (2006.01)
(52) U.S. Cl.
  CPC .......... *B60L 11/187* (2013.01); *B60L 11/184* (2013.01); *B60L 11/185* (2013.01); *B60L 11/1816* (2013.01); *B60L 11/1874* (2013.01); *B60L 11/1875* (2013.01); *B60L 2230/30* (2013.01); *Y02T 10/7005* (2013.01); *Y02T 10/705* (2013.01); *Y02T 10/7094* (2013.01); *Y02T 90/121* (2013.01); *Y02T 90/128* (2013.01); *Y02T 90/14* (2013.01); *Y02T 90/169* (2013.01); *Y04S 30/14* (2013.01)

(58) Field of Classification Search
  CPC ...... B60L 11/187; B60L 11/184; B60L 11/185
  (Continued)

(56) References Cited

U.S. PATENT DOCUMENTS 5,283,513 A * 2/1994 Fujita .................. B60L 11/1816
  307/10.1
5,306,999 A * 4/1994 Hoffman ............. B60L 11/1818
  320/109

(Continued)

FOREIGN PATENT DOCUMENTS

| WO | WO 2010/132443 A1 | 11/2010 |
| WO | WO 2013/019336 | 2/2013 |
| WO | WO 2013/019989 | 2/2013 |

OTHER PUBLICATIONS

"Radio-frequency Identification (RFID) technology: the expect view," Warwick Ashford, Published 2007 [according to google], saved to the Wayback Machine May 31, 2013, Accessed Oct. 22, 2015, http://web.archive.org/web/20130701000000*/http://www.computerweekly.com/feature/Radio-frequency-identification-RFID-technology-the-expert-view.*

*Primary Examiner* — Robert Grant
*Assistant Examiner* — John Trischler
(74) *Attorney, Agent, or Firm* — Davidson, Davidson & Kappel, LLC

(57) ABSTRACT

An electric vehicle recharging station is provided. The electric vehicle recharging station includes an electric power supply system for rapidly recharging an onboard electric vehicle battery. The electric power supply system includes a first energy source and a battery bank including one or more rechargeable charging batteries for rapidly recharging the onboard electric vehicle battery. The electric vehicle recharging station also includes a temperature management system providing heat exchange fluid to both the onboard electric vehicle battery and the battery bank to thermally condition the onboard electric vehicle battery and the battery bank. A method of recharging onboard electric vehicle batteries is also provided.

20 Claims, 7 Drawing Sheets

(58) Field of Classification Search
USPC .................................................. 320/109, 104
See application file for complete search history.

(56) References Cited

U.S. PATENT DOCUMENTS

| | | | | |
|---|---|---|---|---|
| 5,323,099 A * | 6/1994 | Bruni | .................... | B60L 11/182 320/108 |
| 5,341,083 A * | 8/1994 | Klontz | ................ | B60L 11/1816 320/109 |
| 5,538,809 A * | 7/1996 | Bittihn | .................... | B60K 1/04 320/109 |
| 5,548,200 A * | 8/1996 | Nor | ........................ | B60L 11/184 320/106 |
| 5,594,318 A * | 1/1997 | Nor | .................... | B60L 11/1816 320/108 |
| 5,765,656 A * | 6/1998 | Weaver | ................ | B60L 11/123 180/65.22 |
| 6,362,594 B2 * | 3/2002 | Kajiura | ......................... | 320/104 |
| 6,930,410 B2 * | 8/2005 | Ikeda | ........................ | B60L 3/00 235/381 |
| 7,109,684 B2 * | 9/2006 | Takaoka | ................ | H02J 7/0029 320/132 |
| 7,248,018 B2 * | 7/2007 | Sanders, Jr. | ............... | B60L 8/00 320/101 |
| 7,256,516 B2 * | 8/2007 | Buchanan | ........... | B60L 11/1811 307/62 |
| 7,629,773 B2 * | 12/2009 | Eberhard | ................ | H02J 7/045 320/104 |
| 7,683,570 B2 * | 3/2010 | Krauer | .................... | B60L 1/04 180/65.29 |
| 7,683,582 B2 * | 3/2010 | Zhu | ......................... | B60K 6/48 320/104 |
| 7,940,028 B1 * | 5/2011 | Hermann | ............ | H01M 16/006 320/104 |
| 8,013,569 B2 * | 9/2011 | Hartman | .............. | B60L 11/1822 180/165 |
| 8,013,571 B2 * | 9/2011 | Agassi | .................... | B60K 1/04 320/109 |
| 8,049,460 B2 * | 11/2011 | Krauer | ................ | B60L 11/1875 320/104 |
| 8,098,044 B2 * | 1/2012 | Taguchi | .............. | B60L 11/1816 320/109 |
| 8,099,198 B2 * | 1/2012 | Gurin | ........................ | B60K 6/28 180/65.21 |
| 8,106,627 B1 * | 1/2012 | Rossi | .................. | B60L 11/1816 307/18 |
| 8,120,310 B2 * | 2/2012 | Littrell | ...................... | H02J 7/35 320/101 |
| 8,288,986 B2 * | 10/2012 | Flack | .................. | B60L 11/1818 320/104 |
| 8,344,692 B2 * | 1/2013 | Sakurai | .............. | B60L 11/1811 180/65.1 |
| 8,450,966 B2 * | 5/2013 | Krauer | ................ | B60L 11/1875 320/104 |
| 8,692,506 B2 * | 4/2014 | Saito | .................... | B60L 3/0046 320/103 |
| 8,725,330 B2 * | 5/2014 | Failing | .................... | B60L 3/00 701/22 |
| 8,760,116 B2 * | 6/2014 | Fujii | ........................ | B60L 1/04 219/202 |
| 8,941,356 B2 * | 1/2015 | Xu | .................... | H01M 10/5006 320/107 |
| 8,963,481 B2 * | 2/2015 | Prosser | ................ | H02J 7/0054 320/103 |
| 9,000,724 B2 * | 4/2015 | Minami | ............. | B60H 1/00278 320/109 |
| 9,007,020 B2 * | 4/2015 | Prosser | ................ | H02J 7/0054 320/104 |
| 2001/0002786 A1 * | 6/2001 | Najima | .................... | B60L 3/04 320/108 |
| 2001/0003416 A1 * | 6/2001 | Kajiura | ............... | B60L 11/1825 320/109 |
| 2005/0111167 A1 * | 5/2005 | Yamaguchi | ........... | B60L 15/007 361/676 |
| 2005/0167169 A1 * | 8/2005 | Gering | ............... | B60H 1/00278 237/12.3 B |
| 2006/0219448 A1 * | 10/2006 | Grieve | .................... | B60L 11/18 180/65.31 |
| 2007/0023078 A1 * | 2/2007 | Palladino | .............. | H01L 31/042 136/244 |
| 2007/0024244 A1 * | 2/2007 | Zhu | ......................... | B60K 6/48 320/150 |
| 2008/0119965 A1 * | 5/2008 | McCrary | ................. | B60O 7/00 701/2 |
| 2008/0211230 A1 * | 9/2008 | Gurin | .................. | B60L 11/1861 290/2 |
| 2008/0275600 A1 * | 11/2008 | Rask | ........................ | B60K 6/24 701/22 |
| 2009/0139781 A1 * | 6/2009 | Straubel | .............. | B60L 11/1875 180/65.1 |
| 2009/0200987 A1 * | 8/2009 | Saito | .................... | B60L 3/0046 320/134 |
| 2009/0256523 A1 * | 10/2009 | Taguchi | .............. | B60L 11/1816 320/109 |
| 2010/0006356 A1 | 1/2010 | Curry et al. | | |
| 2010/0134067 A1 * | 6/2010 | Baxter | ................ | B60L 3/0084 320/109 |
| 2010/0315040 A1 * | 12/2010 | Sakurai | .............. | B60L 11/1811 320/109 |
| 2011/0025267 A1 * | 2/2011 | Kamen | .................. | B60L 8/003 320/109 |
| 2011/0055037 A1 * | 3/2011 | Hayashigawa | ....... | B60L 3/0069 705/26.1 |
| 2011/0074350 A1 | 3/2011 | Kocher | | |
| 2011/0115425 A1 * | 5/2011 | Olsson | .................. | B60L 3/0046 320/101 |
| 2011/0202418 A1 * | 8/2011 | Kempton | .............. | B60L 11/1824 705/26.1 |
| 2011/0266996 A1 * | 11/2011 | Sugano | .................. | B60L 3/003 320/104 |
| 2011/0267004 A1 * | 11/2011 | Krauer | ................ | B60L 11/1875 320/109 |
| 2011/0316482 A1 * | 12/2011 | Baxter | .................. | B60L 3/0084 320/109 |
| 2012/0005031 A1 * | 1/2012 | Jammer | ............. | B60L 11/1816 705/16 |
| 2012/0007542 A1 * | 1/2012 | Jammer | ............. | B60L 11/1824 320/101 |
| 2012/0013300 A1 * | 1/2012 | Prosser | ............... | B60L 11/1844 320/109 |
| 2012/0025762 A1 * | 2/2012 | Lienkamp | ............. | B60L 3/0046 320/109 |
| 2012/0025777 A1 * | 2/2012 | Xu | .................... | H01M 10/5006 320/129 |
| 2012/0041855 A1 * | 2/2012 | Sterling | ................. | B60L 3/0046 705/34 |
| 2012/0043935 A1 * | 2/2012 | Dyer | ...................... | B60L 1/003 320/109 |
| 2012/0043943 A1 * | 2/2012 | Dyer | ...................... | B60L 11/1809 320/137 |
| 2012/0074901 A1 * | 3/2012 | Mohammed | ........ | B60L 11/1842 320/109 |
| 2012/0146585 A1 * | 6/2012 | Darcy | ...................... | H02J 3/32 320/128 |
| 2012/0212174 A1 * | 8/2012 | Ishikawa | .............. | B60L 11/1809 320/103 |
| 2012/0299531 A1 * | 11/2012 | Prosser | ................ | H02J 7/0054 320/104 |
| 2012/0299544 A1 * | 11/2012 | Prosser | ................ | H02J 7/0054 320/109 |
| 2013/0029193 A1 * | 1/2013 | Dyer | ...................... | H01M 10/486 429/62 |
| 2013/0069591 A1 * | 3/2013 | Iyasu | .................... | H02J 7/1461 320/109 |
| 2014/0091748 A1 * | 4/2014 | Hermann | ............. | H02J 7/0075 320/103 |

(56) References Cited

U.S. PATENT DOCUMENTS

2014/0093760 A1\* 4/2014 Hermann .............. H02J 7/0075
    429/66
2014/0203077 A1\* 7/2014 Gadh ........................ H02J 7/00
    235/382
2014/0333261 A1\* 11/2014 Oh ...................... B60L 11/1827
    320/109

\* cited by examiner

ELECTRIC VEHICLE RECHARGING STATION INCLUDING A BATTERY BANK

This claims the benefit to U.S. Provisional Patent Application No. 61/868,719, filed on Aug. 22, 2013, which is hereby incorporated by reference herein.

The present invention relates generally to an electric vehicle recharging station and more specifically to an electric vehicle recharging station including an energy banking system.

BACKGROUND

Electric vehicle recharging stations are dependent on an aging civilian/commercial grid that may be vulnerable to disruption.

SUMMARY OF THE INVENTION

An electric vehicle recharging station is provided. The electric vehicle recharging station includes an electric power supply system for rapidly recharging an onboard electric vehicle battery. The electric power supply system includes a first energy source and a battery bank including one or more rechargeable charging batteries for rapidly recharging the onboard electric vehicle battery. The electric vehicle recharging station also includes a temperature management system providing heat exchange fluid to both the onboard electric vehicle battery and the battery bank to thermally condition the onboard electric vehicle battery and the battery bank.

A method of recharging onboard electric vehicle batteries is also provided. The method includes recharging one or more batteries of a battery bank via an energy source; alternately coupling the energy source and the battery bank to an electricity supply line of a rapid recharging station for recharging the onboard electric vehicle batteries; and providing heat exchange fluid to both the onboard electric vehicles batteries and one or more batteries of the battery bank.

An electric vehicle recharging station is also provided that includes an electric power supply system comprising a first energy source and a battery bank including one or more rechargeable charging batteries, the first energy source recharging the battery bank at a first power, the battery bank recharging onboard electric vehicle batteries at a second power greater than the first power such that the first energy source is prevented from being exposed to the stress of discharging at the second power. The electric vehicle recharging station also includes a temperature management system providing heat exchange fluid to at least one of the onboard electric vehicle battery and the battery bank to thermally condition at least one of the onboard electric vehicle battery and the battery bank.

An electric vehicle recharging station is also provided that includes an electric power supply system comprising a first energy source and a battery bank including one or more rechargeable charging batteries, the first energy source recharging the battery bank, the battery bank and the first energy source alternately recharging a battery onboard an electric vehicle; a temperature management system providing heat exchange fluid to at least one of the onboard electric vehicle battery and the battery bank to thermally condition at least one of the onboard electric vehicle battery and the battery bank; a detector for receiving information from an information source on the electric vehicle, the information source providing the detector with recharging parameters of the battery onboard the electric vehicle; and a controller coupled to the detector, the controller controlling recharging of the onboard battery by the electric power supply system and the providing of heat exchange fluid from the temperature management system based on the recharging parameters.

BRIEF DESCRIPTION OF THE DRAWINGS

The present invention is described below by reference to the following drawings, in which.

DETAILED DESCRIPTION

Figure 1:
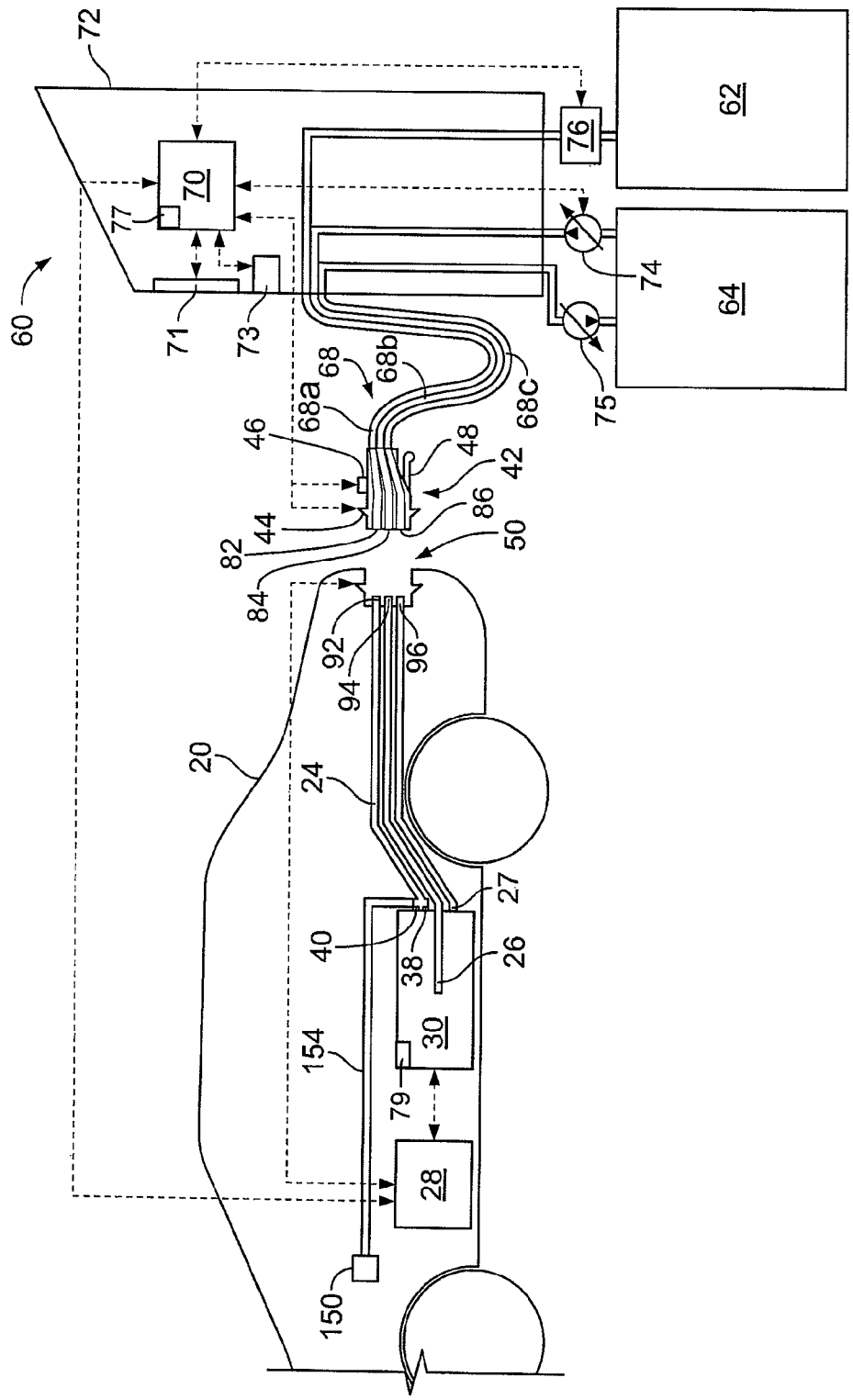
FIG. 1 schematically shows a rapid charging station for charging an electric vehicle according to an embodiment of the present invention.

Embodiments of the present invention involve using a bank of rechargeable charging batteries including advanced storage technology to store and dispense energy and power to an onboard rechargeable battery of an electric vehicle, particularly in rapid roadside charging stations, and use of heat exchange fluid to cool and heat batteries of the rapid roadside charging stations and the onboard rechargeable batteries of electric vehicles.

The manufacture and sale of electric vehicles and rechargers have become an important aspect for the growth of an electric vehicle industry. To succeed in the market, it is preferable that electric vehicles and rechargers meet and exceed the expectations established by competing traditional vehicles. In so doing, electric vehicle makers seek to improve the range and alleviate range anxiety for the end-users. One way of improving the electric vehicle acceptance is by adding a high rate recharging capability to the recharger and the vehicle. One type of high rate recharger is known as an ultra-rapid recharger in which the delivery of recharging and temperature control into the vehicle is delivered from a single integrated device or system. Such a recharger and corresponding charging methods are described in U.S. Pat. No. 8,174,235 and U.S. Pat. No. 8,350,526, which are assigned to the assignee of the present application.

Although these methods and devices are beneficial for overcoming thermal issues for high rate charging of electric vehicle batteries, determining where or when the electric grid is insufficient for high rate discharging, for achieving high rate recharging, still remains problematic. Many current and potential future electric vehicle users may still be concerned with becoming stranded due to power outages or recharging intervals requiring long waiting periods.

Embodiments of the present invention may control the interface of a rapid or ultra-rapid vehicle recharging such that a high rate operation is not inadvertently drawing from the grid at a rate exceeding the grid capacity or robustness.

Sufficient reserve energy may be made available to mitigate disruption of the primary power source, such as the grid. It may be beneficial to provide an electric vehicle recharging station with a battery bank that stores primary energy from the primary power source and supplies all or part of the vehicle recharge at a high rate while isolating the primary power source from the high rate event of electric vehicle recharge. The battery bank may be recharged at slower rates from the primary power source than required by high rate charging of electric vehicle batteries, acting as a storage reserve that further mitigates risks of disruption, and then may be discharged for high rate recharging of the onboard electric vehicle batteries.

Since temperature conditions can affect the rate capability and rate performance of a battery, onboard electric vehicle batteries as well as the battery bank of the electric vehicle recharging station can become vulnerable to thermal problems. For instance dendrite formation can be exacerbated in cold conditions, and safety risks and premature aging can occur during excess heat periods. Accordingly, there are benefits to a single system or device integrating not only the delivery of recharging and temperature control into the onboard vehicle battery, but also integrating the discharging and temperature control for a battery bank of the electric vehicle recharging station. By such integration, it may become further possible to optimize the recharging rate and temperature control for either one or both of the onboard electric vehicle batteries and the battery bank of the electric vehicle recharging station. The advantages of such a method and system may include bilateral or multi-lateral control of the temperature and rate recharge across the onboard electric vehicle batteries and the battery bank of the electric vehicle recharging station, including high rate discharge from the battery bank and high rate recharge of the onboard electric vehicle battery. Through a single integrated control across such a system, a much more efficient, safe and cost-effective high rate transfer of energy may be provided to the vehicle. Thus embodiments of the present invention may overcome a major issue of an aging grid that is otherwise insufficient to support wide-spread high-rate electric vehicle battery recharging.

Embodiments of the present invention provide high power DC electric supply roadside charging stations capable of "ultra-rapid" recharging, which involves delivering up to 300 kW per electric vehicle (e.g., for 6 minutes charging of a 30 kWh electric vehicle battery) or more together with a heat exchange fluid for cooling the electric vehicle battery during charging so that the battery does not overheat (up to ~50 kW of heat for example may be expected to be generated during 6 to 12 minutes of charge time). Ultra-rapid rate recharging may take between 1 and 12 minutes and as such is faster than "DC fast" recharging (i.e., Level III recharging), which involves delivering a power of between approximately 20 kW and 80 kW and charges batteries in 20 to 40 minutes, and is considerably faster than slow AC recharging (i.e., Level I and Level II home recharging), which involves delivering a power of between approximately 0.67 kW and 7.7 kW for charging between 4 and 20 hours.

Further, embodiments of the present invention may provide rapid recharging stations that include a bank of rechargeable charging batteries for charging onboard electric vehicle batteries. The charging batteries may be recharged by the grid or a renewable energy source or a micro generating source (such as a localized natural gas fueled electric generator or fuel cell) and are discharged to recharge the onboard electric vehicle batteries as directed by a controller. The controller may alternate between the grid and the bank of charging batteries as the source for recharging the onboard electric vehicle batteries based on an algorithm. The algorithm may take into account parameters to minimize price of the electricity used to recharge the onboard electric vehicle batteries and to minimize strain on the grid. For example, the grid may be used to recharge the bank of rechargeable charging batteries during times of off peak grid usage and bank of rechargeable charging batteries may be used to recharge the onboard electric vehicle batteries during peak grid usage. During off peak grid usage, the grid may also directly charge the onboard electric vehicle batteries.

In other advantageous embodiments of the present invention, for use in areas where the grid is not equipped for high rate recharging, the grid may slowly charge the battery bank, and then the battery bank may rapidly recharge the onboard electric vehicle battery, preventing the grid from being exposed to the stress caused by high rate recharging. In one such embodiment, the grid is solely used in the recharging station to charge the battery bank, and not to recharge onboard vehicle batteries. In other embodiments, the grid may be used for recharging of the onboard vehicle batteries at a power less than the maximum power that battery bank recharges the onboard vehicles batteries. For one exemplary recharging station location, recharging from the grid at a power of 300 kW may cause grid failure or significant strain during both peak and off peak times of electricity consumption; however, recharging from the grid at a power of approximately 40 kW or less is acceptable during times of peak or off-peak consumption and recharging from the grid at a power of approximately 80 kW or less is acceptable during times of peak consumption. Accordingly, this exemplary recharging station may only use the battery bank for ultra-rapid rate recharging, but may use the grid or the battery for DC fast recharging, depending on the electricity consumption at the time and other factors.

FIG. 1 schematically shows rapid charging station 60 for charging an electric vehicle 20 according to an embodiment of the present invention. In a preferred embodiment, electric vehicle 20 is for example the electric vehicle disclosed in U.S. Publication No. 2013/0029193, the entire disclosure of which is also hereby incorporated by reference herein. For example, electric vehicle 20 may be charged according to the methods disclosed in U.S. Publication No. 2012/0043943, the entire disclosure of which is also hereby incorporated by reference herein. In the preferred embodiment of the present invention, electric vehicle 20 is a pure electric vehicle including an electric vehicle battery 30, but not an internal combustion engine, powering a drive system of vehicle 20. In an alternative embodiment, electric vehicle 20 may be a hybrid electric vehicle and may include an internal combustion engine working in cooperation with electric vehicle battery 30. Vehicle 20 may include a controller 28 coupled to electric vehicle battery 30 for determining the state of battery 30 and for regulating the operation and charging of battery 30 accordingly.

Figure 2:
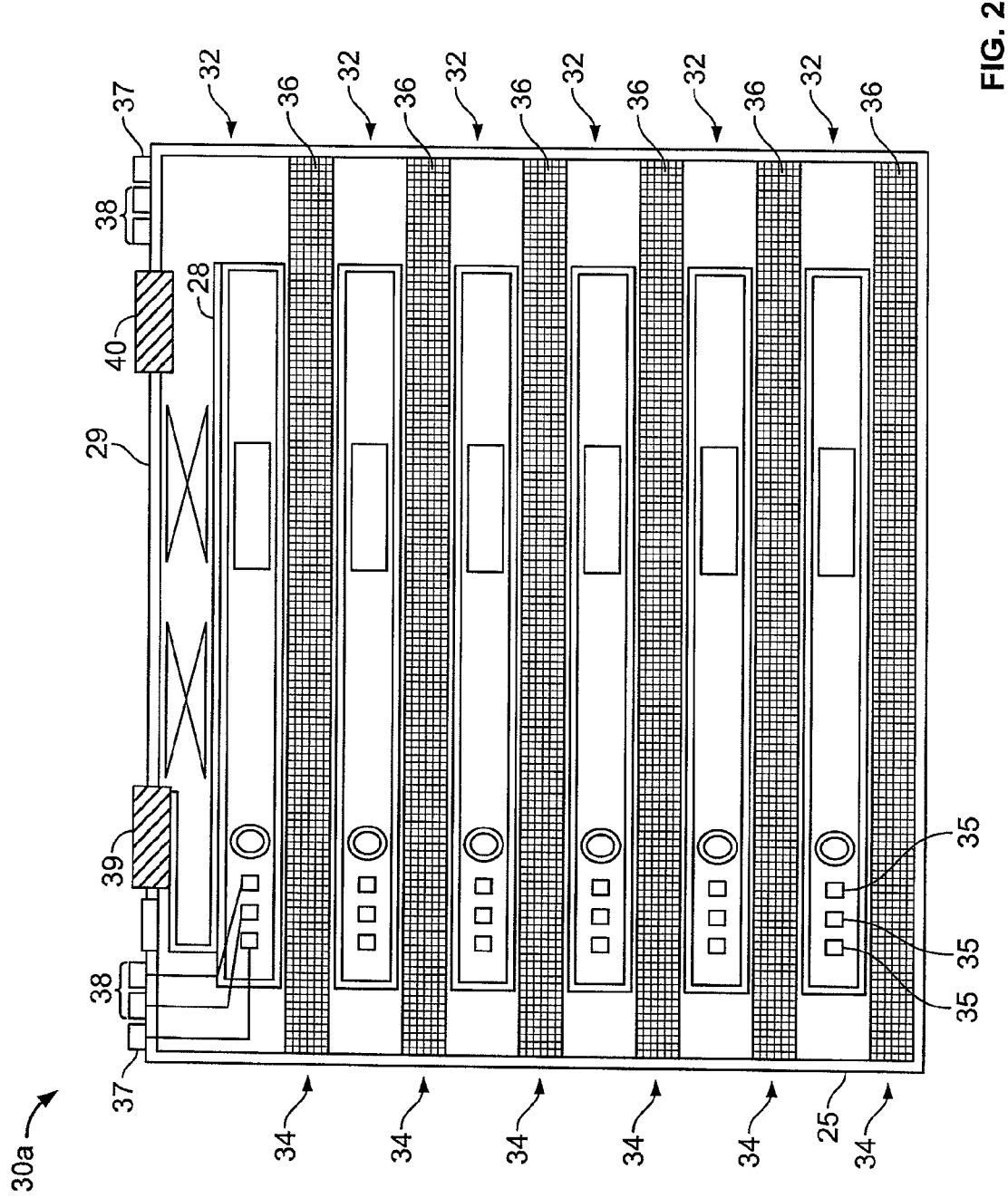
FIG. 2 shows one exemplary embodiment of a battery for use in the present invention.

FIG. 2 shows one exemplary embodiment of an electric vehicle battery 30*a* that may be used as electric vehicle battery 30*a*. Electric vehicle battery 30*a* may be a modular battery including a plurality of battery cells 32 separated by a plurality of internal channels 34 in battery 30*a* in between cells 32. Channels 34 are preferably at least partially filled with porous compressible interconnectors 36, which act to provide an electrically-conducting interconnection between adjacent cells 32 while also allowing heat exchange fluid to be passed through internal channels 34 between cells 32 to cool or heat cells 32 before or during charging. In preferred embodiments, battery 30a is the battery disclosed in U.S. Pub. No. 2009/0239130, which is hereby incorporated by reference herein, with interconnectors 36 and cells 32 being formed in the same manner as the interconnectors and the planar cell modules, respectively, disclosed in U.S. Pub. No. 2009/0239130. Cells 32 each include a positive and a negative electrode, with the positive electrodes connecting to a positive terminal 39 and the negative electrodes connecting to a negative terminal 40.

Compressible interconnectors 36 may be made any material that has sufficient properties such as, for example a wire mesh, metal or carbon fibers retained in a compressible elastomeric matrix, or an interwoven conducting mat, consistent with the requirement for a compressible flexible electrically-conducting interconnection between adjacent cell plate module surfaces while maintaining sufficient spacing for heat exchange fluid to be passed through internal channels 34 to heat or cool cells 32 during or before charging. In the illustrative example in FIG. 2, six cells 32 are contained in a stacked array within an enclosure 25 which, in this embodiment, is of rectangular cross section. Although only six cells 32 are shown, battery 30a may include tens to hundreds of cells interconnected to make a very high-voltage battery stack. Enclosure 25 includes inputs and outputs, which may be automatically opened or closed, allowing heat exchange fluid to be passed through channels 34.

In alternative embodiments, interconnectors 36 may not be electrically and/or thermally conductive, but may simply be provided between cells 32 to space cells 32 apart from each other to form channels 34 between cells. In these embodiments, cells 32 may be formed as insulating pouches with conductive tabs at the ends thereof which allow heat exchange fluid passing through channels 34 formed by interconnectors 36 to cool or heat cells 32.

The power terminals 39, 40 connect internally to the ends of the cell module battery stack through an internal power bus 31 for the positive terminal 39 and electrically conductive enclosure 25 may serves as a negative bus 29 to negative terminal 40 or a negative bus may additionally be provided for negative terminal 40. Enclosure 25 may be provided with external multipin connectors 37, 38, which may be electrically connected by sense lines to electrical feed throughs 35, for monitoring cell voltage and cell temperature, respectively. One set of multipin connectors 37, 38 may be provided for each cell 32. In order to provide cell voltage and cell temperature information for controlling the charging of battery 30a, multipin connectors 37, 38 may transmit voltage and cell temperature measurements to controller 28 (FIG. 1).

Figure 3A:
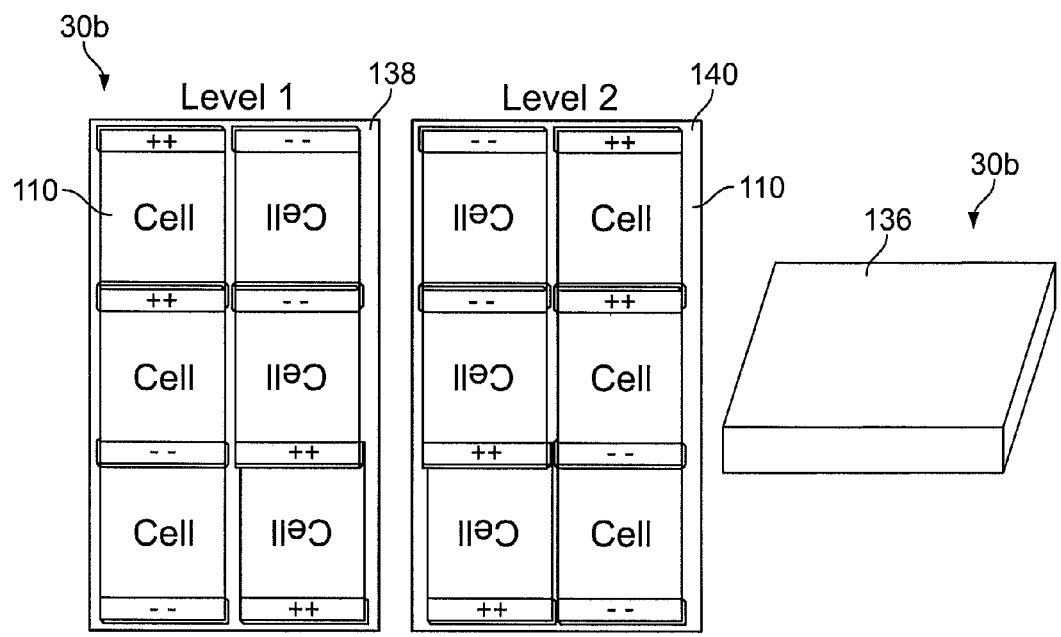
FIGS. 3a and 3b shows another exemplary embodiment of a battery for use in the present invention.
Figure 3B:
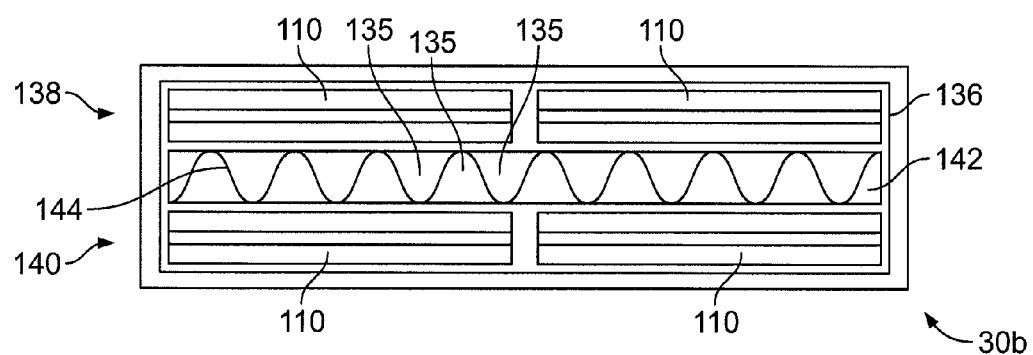

FIGS. 3a and 3b shows another exemplary embodiment of an electric vehicle battery 30b that may be used as electric vehicle battery 30. Battery 30b includes a plurality of cells 110 housed inside a thermally insulated enclosure 136. In a preferred embodiment, enclosure 136 has a planar form-factor for integrating into a vehicle design, where the enclosure 136 is mounted in the floor-pan or integrally comprising the floor pan, which minimizes intrusion into passenger volume, maintains a low center of gravity, and enables multi-functionality such as impact absorbance and fire/safety barrier. As shown in two plan views on the left side of FIG. 3a, enclosure 136 houses two layers 138, 140 stacked on top of each other. FIG. 3a shows each layer 138, 140 includes six cells 110, providing a layout for twelve cells 110 inside of enclosure 136. Alternate layouts can add additional layers (up to the total thickness that can be accommodated in the vehicle design), along with alternate series/parallel connection schemes. A battery intended for long-range (~300 mile) electric vehicle operation may include up to 1,000 or more cells.

FIG. 3b shows a cross sectional side view of battery 30b. A heat exchanger 142 is provided between the two layers 138, 140 for heating or cooling cells 110. In this embodiment, heat exchanger 142 is formed by attaching two flat metal plates to the opposite sides of a corrugated metal plate 144 to define a plurality of parallel channels 135 within heat exchanger 142. Heat exchange fluid from temperature management system 64 is provided through channels 135 of heat exchanger 142 to heat or cool cells 110. In embodiments including more layers of cells, more heat exchangers may be used. For example, batteries that stack n layers of cells would include n−1 heat exchanger planes, interposed between cells.

Figure 3C:
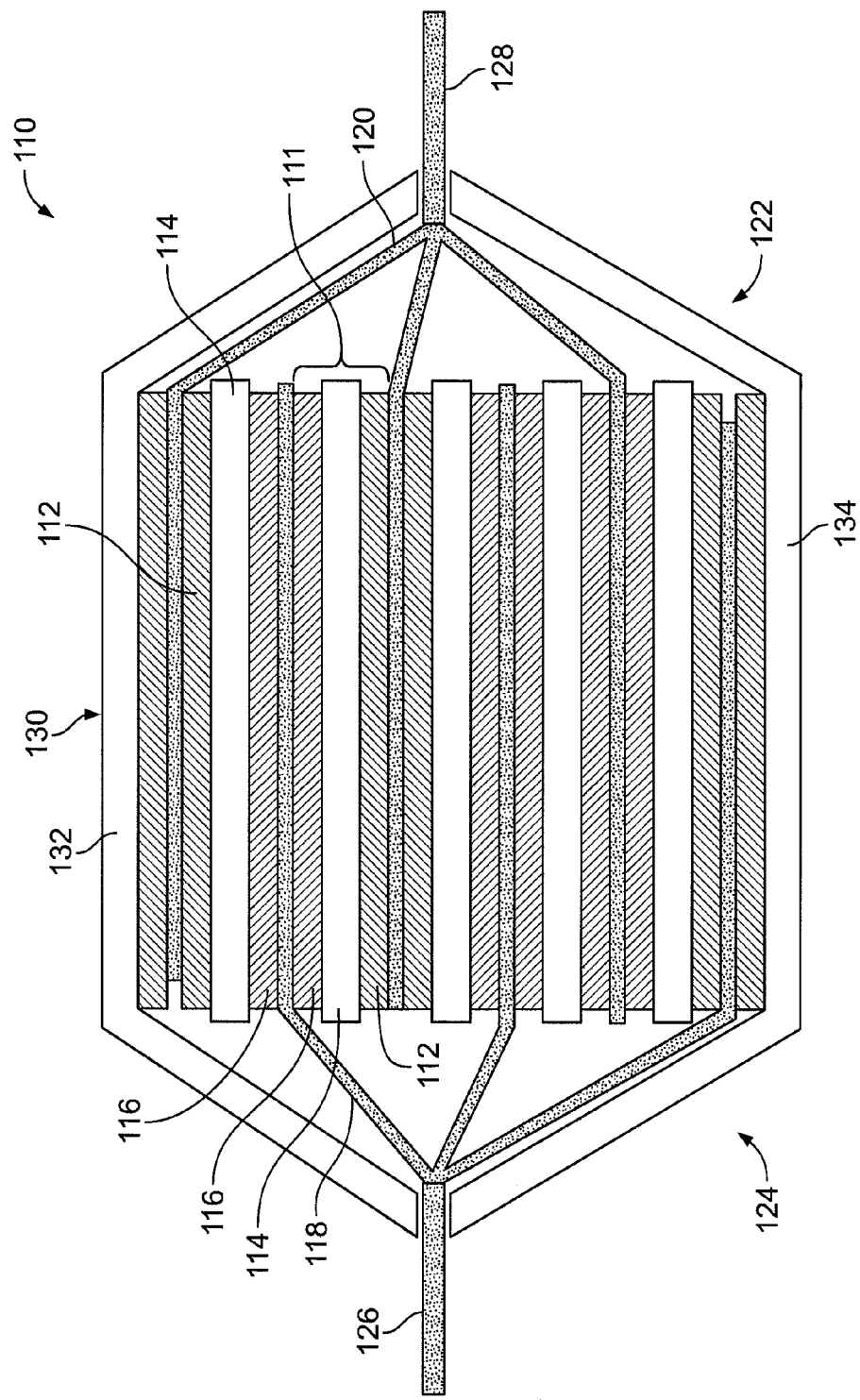
FIG. 3c shows an exemplary cell of the battery shown in FIGS. 3a and 3b.

FIG. 3c shows a cross-sectional view of one of battery cells 110, which is formed by stacking plates 111 of anode material 112, solid polymer electrolyte material 114 and cathode material 116 in repeating sequences. In a preferred embodiment, battery cell 110 is a lithium sulfur cell, with lithium forming the anode material 112 and sulfur forming the cathode material 116. Polymer electrolyte material 114 may contain polyethylene oxide. The plates 111 may be formed by coating the polymer electrolyte material on one side of the sulfur material, then laminating the lithium material on the other side of the polymer electrolyte material. Each plate 111 may be sandwiched between an anode current collector 118, which includes anode material 116 on both sides thereof, and a cathode current collector 120, which includes cathode material 112 on both sides thereof. The current collectors of common electrodes (anode or cathode) are connected together at opposite ends of the cell, which in turn, are connected to external terminals or tabs. In other words, as shown in FIG. 3c anode current collectors 118 extend longitudinally away from a first longitudinal side 122 of cell 110 to connect to each other at a second longitudinal side 124 of cell 110, and cathode current collectors 120 extend longitudinally way from second longitudinal side 124 to connect to each other at first longitudinal side 122. The joined anode current collectors 118 form a tab 126 protruding at the end of longitudinal side 124 and the joined cathode current collectors 120 form a tab 128 protruding at the end of longitudinal side 122. In this embodiment, separators are not provided between adjacent sets of cathode and anode material 112, 116; however, in other embodiments separators may be included in such a manner.

Each individual cell 110 includes a package 130 surrounded the energy storing parts (plates 111 and current collectors 118, 120), with tabs 126, 128 protruding longitudinally outside of package 130. In this embodiment package 130 is depicted as being a two-piece housing, including an upper piece 132 and a lower piece 134. Package 130 may be formed as a plastic clam-shell case, with upper piece 132 being hinged to lower piece 134, such that package 130 may be opened and closed by swinging upper piece 132 about the hinge. After the energy storing parts of cell are placed inside of package 130, upper piece 132 may be sealed to lower piece 134 and pieces 132, 134 may be sealed to tabs 126, 128 by welding or with a bead of adhesive (e.g. two-part epoxy). Package 130 may be formed from mechanically robust materials having a very low moisture permeation rate. In one embodiment, package 130 may be formed of a liquid crystal polymer (LCP). A typical size for a cell intended for an automotive application is around 6 inches square by ¼ inch thick.

Referring back to FIG. 1, rapid charging station 60 may include an electric power supply system 62 for rapidly charging battery 30 of vehicle 20 and a temperature management system 64 for supplying heat exchange fluid to battery 30 as battery 30 is rapidly charged by electric power supply system. The driver of vehicle 20 may pull into rapid charging station 60, turn off vehicle 20 and insert a connector 42 on an end of a supply line 68 of rapid charging station 60 into a corresponding receptacle 50 of vehicle 20 that is accessible from the outside of vehicle 20. In the embodiment shown in FIG. 1, supply line 68 extends outside of a base portion 72 and includes an electrical supply line 68a, which may be a cable, coupled to electric power supply system 62 and a heat exchange fluid supply line 68b, which may be a hose, coupled to temperature management system 64. The driver may insert connector 42 into receptacle 50 of vehicle 20 such that connector 42 is temporarily locked into place in receptacle 50. Receptacle 50 may include one or more grooves 52 formed therein for receiving a corresponding number of protrusions 44 extending radially from connector 42. Protrusions 44 may be spring loaded with respect to connector 42 and may be forced to retract radially into connector 42 via contact with the outside of receptacle 50 and then actuate radially outward into grooves 52 once connector 42 is in receptacle 50. Protrusions may also be retracted via the driver pushing a locking/unlocking actuator 46, which in this embodiment is a push button on connector 42, and once connector 42 is inserted in receptacle 50, actuator 46 may be released so protrusions 44 enter into grooves 52. After connector 42 is locked in place in receptacle 50, with protrusions 44 cooperating with grooves 52 to prevent connector 42 from being pulled out of receptacle 50, the driver may activate a charging/cooling actuator, which in this embodiment is in the form of a handle 48 that may be gripped and squeezed toward connector 42 to begin the flow of current from electric power supply system 62 and the flow of heat exchange fluid from temperature management system 64 into battery 30.

After heat exchange fluid passes through battery 30 and exits outlets of battery 30, the heat exchange fluid enters into a heat exchange fluid return conduit 27 coupled to the outlets of battery 30. The heated heat exchange fluid then is pumped out of a heat exchange fluid outflow section 96 in receptacle 50 into a heat exchange fluid return section 86 in a connector 42 and through a return line 68c into temperature management system 64 by a return pump 75. The heat exchange fluid returned to temperature management system 64 is thermally conditioned by temperature management system 64 for reuse. After the heat exchange fluid is appropriately thermally conditioned the heat exchange fluid may be pumped from temperature management system 64 via a pump 74 back into vehicle 20 for further cooling or heating of battery 30. In order to prevent connector 42 from being removed from receptacle 50 before heat exchange fluid is recycled back into connector 42, connector 42 may include a sensor in communication with controller 70 such that controller may prevent protrusions 44 from being retracted while heat exchange fluid is being passed from heat exchange fluid outflow section 96 to heat exchange fluid return section 86.

In this embodiment, in order to charge battery 30 during extended periods of nonuse, vehicle 20 includes a separate receptacle 150 for coupling to a charger that is plugged into a standard 120 volt or 240 volt AC electrical outlet present in a garage of a home or any other residence or business for overnight charging in order to fully or partially charge electric vehicle battery 30. A charging cord extending from the charger to battery 30 may be detachably coupled to an electric conduit 154 via receptacle 150 in order to fully or partially charge electric vehicle battery 30. Due to the limited rate at which battery 30 may be charged by a standard 120 volt or 240 volt AC electrical outlet, providing external heat exchange fluid into battery 30 during charging via a standard 120 volt or 240 volt AC electrical outlet is not necessary.

A controller 70 may be provided for controlling the amount of charge supplied to battery 30 from electric power supply system 62 and to control the amount of heat exchange fluid supplied to battery 30 from temperature management system 64 and back into temperature management system 64. As vehicle 20 is connected to rapid charging station 60 for charging battery 30, controller 70 may be brought into communication with controller 28 of battery 30 such that controller 70 may regulate the supply of electrical charge from electric power supply system 62 and the supply of heat exchange fluid from temperature management system 64 according to the present state of battery 30. For example, if due to the weather conditions or the manner in which vehicle 20 has been driven, battery 30 is warmer or cooler than usual (for example as measured by connectors 37, 38 shown in FIG. 2), the supply of heat exchange fluid from temperature management system 64 may be increased or decreased accordingly. Also, if battery 30 is partially charged and only needs to be charged a small amount, controller 70 may limit the supply of electrical charge from electric power supply system 62 to below the maximum charging rate and adjust the flow rate of heat exchange fluid from temperature management system 64 to a corresponding value. Controller 70 may include a memory that correlates the amount of heat exchange fluid to be supplied to the charge supplied and also optionally to the temperature of battery 30. Controller 28 may also provide controller 70 with information regarding the present chemistry of battery 30, as sensed at battery 30, and controller 70 may control the charging and thermal conditioning of battery 30 based on the chemistry of battery 30 to allow for the safest protocols for recharging battery 30. For example, an older battery 30 may not take the fastest recharging rates or may have a slightly different chemistry and may be charged by rapid charging station 60 according to preset chemistry charging and thermal conditioning rates stored in controller 70.

Controller 70 may also be a coupled to a touchscreen 71 and a credit card receptacle 73. Along with displaying the amount owed by the vehicle owner on touchscreen 71, controller 70 may also provide information to an operator of roadside charging station 60 for charging the amount owed to the vehicle owner, for example in calculating the charge delivered and the price to be charged for the roadside recharging. Touchscreen 71 may present the driver with charging/cooling and payment options and controller 70 may control the supply of heat exchange fluid and charge according to the driver's selections. A driver may insert a credit or debit card into credit card receptacle 73 and a processor in controller 70 may process the payment. Controller 70 also may be coupled with a detector, for example in the form of an radio-frequency identification ("RFID") reader 77 in communication with an information source in the form of a RFID tag 79 of vehicle 20 wherein communication between the reader and tag may input data for controlling one or more of the recharge, heat exchange fluid and transaction parameters. The detector and information source may take a variety of alternative or combined detection and communication forms, such as an optical, magnetic, acoustic, pattern recognition or other detector and compatible information source. Each different electric vehicle may include a battery that is capable of recharging at different rates and that has specific thermal characteristics. For example, certain batteries need to achieve a minimum temperature before being charged. Also, different batteries have different maximum allowable temperatures during charging. The RFID tag reader 77 may determine the battery's parameters, such as battery type and specifications, from reading RFID tag 79 and controller 70 may control of heat exchange fluid from temperature management system 64 based on the reading of tag 79 by reader 77. Battery parameters may also include information regarding onboard component of vehicle 20 that have a role in charging battery 30, such as for example an onboard charger. Since RFID uses wireless radio-frequency electromagnetic fields for identifying and tracking tags attached to or embedded in objects. Since the tags can contain electronically stored information, the tags can provide tracking or control information through a reader without physical contact of the tag or the reader.

In one example, the RFID reader 77 may determine the battery type and specifications by reading RFID tag 79 and controller 70 may control the heat exchange fluid from temperature management system 64 based on the reading of tag 79 by reader 77. In a more detailed example, the RFID tag may include a uniform commercial code ("UCC") and product specification for the batteries. The RFID tag product specification of the battery may comprise data rules for maximum and minimum recharge rate and/or temperature thresholds and limits. By communicating this information from the RFID tag 79, to the reader 77, battery specific operating rules, including temperature requirements, are transferred to the controller 70. In another example, the UCC identifier read by the reader 77 and communicated to the controller 70 may initiate a lookup routine within a database of the controller 70 that is previously populated with temperature data control rules (e.g., minimum temperature threshold and maximum temperature limit categorized by battery UCC classification). Thus the reading of the RFID tag in one example may support a lookup routine that in turn provides interactive commands to the controller which controls the temperature management system 64. For example, an RFID tag abcd1234etc for a specific Lithium Iron Phosphate battery may then be equivalent to interactive programming input to the controller 70 for commanding a specific sequence of routines for the temperature management system 64 supplying heat exchange fluid to the battery for a predetermined time period and rate of flow. In another example, communication of data from the RFID tag may complete the initiation of a command in which the controller operates a feedback loop program of the battery temperature management system 64 to maintain a median range battery temperature with a predetermined range, for example between −30 degrees C. and +85 degrees C., for the duration of recharging, and possibly a predetermined period continuing thereafter.

In one embodiment the vehicle 20 with a nearly discharged battery and RFID tag 79 arrives at recharging station 60. The RFID reader 77 of the recharging station 60 identifies the vehicle 20 through a data lookup routine where the RFID tag provides a unique identifier that is assigned within a prior determined database that is populated or in communication with the controller 70. A prior determined database of the controller 70 supports a lookup routine prompted by the recognition of the RFID identifier, for example, automatically populating key data fields of and commands including specific type, class, and status of the battery 30 and providing the controller 70 with commands for rate of recharge, temperature, time, and other fields to interactively. The pertinent data and command fields are input to a prior determined program and algorithm of controller 70. In one example, the fields of data from the RFID tag 79 are coded to identify the vehicle as standard Nissan Leaf without ultra-high recharging rate and cooling capability, model year 2013, with a 24 kWh battery 39. Communication of data from the RFID tag 79 interacts with a data lookup routine of controller 70, for example to provide rules and input data necessary to interactively program controller 70 in real time to execute a controlled recharging routine for the specific, type class and status of the battery 30 and vehicle 20.

In one further example, the input of the battery type, class data and coded data from the RFID populate program routines of the controller 70 to automatically establish recharge parameters at a rate of recharge to achieve 80% capacity of a full charge in 30 minutes in accord with predetermined algorithm of the invention, and not to exceed a 480 Volt recharger power supply parameter, and to shutdown the recharge upon temperature excursion about 50 degrees C. The routine also stipulates control of recharging with no delivery of heat exchange fluid and delivery of recharging via a J1772 compatible socket interface.

In another further example, a vehicle 20 with a nearly discharged battery and RFID tag 79 arrives at recharging station 60. The RFID reader 77 of the recharger identifies the vehicle 20 through a data lookup routine where the RFID tag provides a unique identifier that is assigned within a prior determined database that is populated or in communication with the controller 70. A prior determined database of the controller 70 supports a lookup routine prompted by the recognition of the RFID identifier, for example, automatically populating key data fields of and commands including specific type, class, and status of the battery 30 and providing the controller 70 with commands for rate of recharge, temperature, time, and other fields for the user to interactively select via touchscreen 71. The pertinent data and command fields are input to prior determined program and algorithm of the controller 70. In one example, the fields of data from the RFID tag are coded to identify the vehicle as special ultra-rapid rate rechargeable Nissan Leaf with cooling capability, model year 2013, with a 24 kWh battery 30 and a port for delivery of heat exchange fluid. Communication of data from the RFID tag interacts with a data lookup routine of the controller 70, for example to provide rules and input data necessary to interactively program the controller in real time to execute a controlled ultra-rapid rate recharging routine for the specific type, class and status of the battery 30 and compatible vehicle 20.

In another further example, the input of the battery type, class data and coded data from the RFID populate program routines of the controller 70 to automatically establish recharge parameters at a rate of recharge to achieve 80% capacity of a full charge in 140 seconds in accord with predetermined algorithm, and not to exceed a 300 kW power supply parameter. The lookup routine from the RFID tag also ultimately stipulates control of the recharger with concurrent recharging and cooling, via special connectors 37, 38, and at a time, rate and temperature and flow rate of the heat exchange fluid stipulated in a prior established algorithm of the controller 70 as commanded by the lookup routine prompted by recognition and reaching of the RFID tag 79 to the RFID reader 77 and to controller 70 as controlling the recharging, temperature management system 64, battery interface and other aspects discussed herein.

After rapid charging station 60 is instructed to begin charging, rapid charging station 60 provides current from electric power supply system 62 and heat exchange fluid from temperature management system 64 to battery 30 until battery 30 is sufficiently charged. Heat exchange fluid is pumped by pump 74 through heat exchange fluid supply line 68b. The heat exchange fluid exits heat exchange fluid supply line 68b at a heat exchange fluid supply section 84 in connector 42 and enters into a heat exchange fluid supply conduit 26 in vehicle 20 at a heat exchange fluid inflow section 94 in receptacle 50. Heat exchange fluid supply conduit 26 is coupled to the inputs of battery 30 and supplies heat exchange fluid to battery 30. Current is sent from electric power supply system 62 by a power feeding apparatus 76 through electrical supply line 68a. The current exits electrical supply line 68a at an electrical supply section 82 in connector 42 and enters into an electrical conduit 24 in vehicle 20 at an electrical inflow section 92 in receptacle 50. In this embodiment connector 42 is formed as a housing that includes both electrical supply section 82 and heat exchange fluid supply section 84. Electrical conduit 24 in vehicle 20 supplies the current to terminals 39, 40 to charge battery 30. In order to prevent connector 42 from being removed from receptacle 50 while current and heat exchange fluid are being supplied into vehicle 20, protrusions 44 are prevented from being retracted into connector 42 during charging. Connector 42 may also include spring loaded couplings at or near heat exchange fluid supply section 84 that allow for quick sealing of supply section 84 during the removal of connector 42 from receptacle 50 to prevent heat exchange fluid leakage.

In another embodiment, the actuation of protrusions 44 and/or an additional locking mechanism may be controlled by controller 70. For example, after connector 42 is inserted into receptacle 50, controller 70 may direct actuators coupled to protrusions 44 to lock protrusions 44 into grooves 52 or to slide the additional locking mechanism into a locking position before charging and heat exchange fluid conditioning may begin. Then, after charging and heat exchange fluid conditioning is complete, controller 70 may direct actuators coupled to protrusions 44 to unlock protrusions 44 from grooves 52 or to slide the additional locking mechanism into an unlocking position.

In another embodiment, the connector 42 may include one or more of a pattern of protrusions and/or readable electronic signals such as by way of a microchip signal whereby the communication between connector 42, receptacle 50 and controller 70 provide a lock and key mechanism that enables the recharger to become switched adaptively between recharging and cooling or simply recharging. In particular, it enables the switching of the recharger function from a high rate and cooled recharger, to a lesser rate and/or non-cooled recharger function.

In order to ensure that heat exchange fluid supply section 84 and heat exchange fluid inflow section 94 are sufficiently coupled together to prevent heat exchange fluid leakage, a pre-test for integrity and leak-tightness of the heat exchange fluid connections, for example by air pressure, may be performed before heat exchange fluid is output from connector 42 into receptacle 50.

In alternative embodiments, connector 42 may be robotically operated automatically by controller 70 of rapid charging station 60, instead of connector 42 being manually operated by a driver of vehicle 20. A robotic arm may extend from base portion 72 and may include sensors for locating receptacle 50. A user may activate the robotic arm for example by inserting a card into credit card receptacle 73 or by interaction with touchscreen 71 and the robotic arm may insert connector 42 into receptacle 50. After connector 42 is inserted into receptacle 50 by the robotic arm, controller 70 may direct actuators coupled to protrusions 44 to lock protrusions 44 into grooves 52 or to slide an additional locking mechanism into a locking position before charging and heat exchange fluid conditioning may begin.

Figure 4:
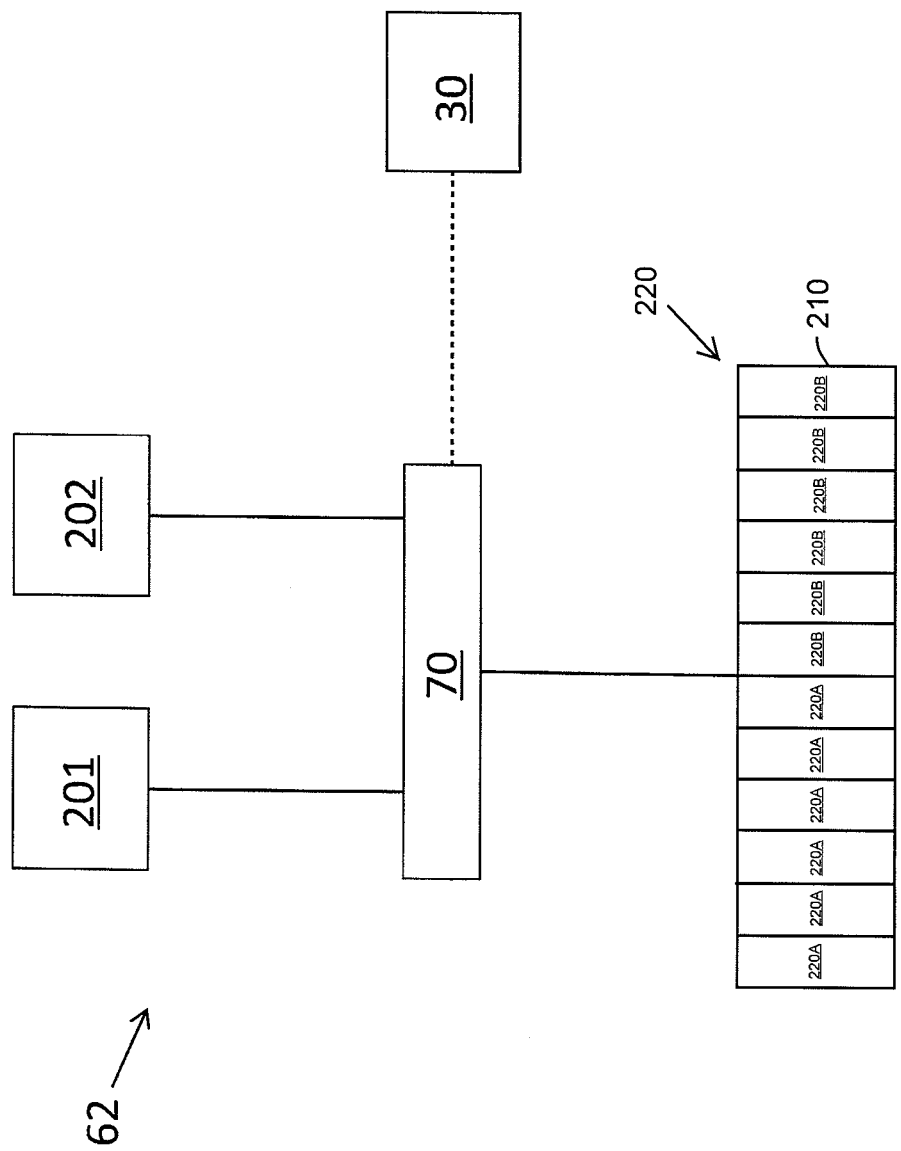
FIG. 4 shows an electric power supply system in accordance with an embodiment of the present invention.

FIG. 4 shows electric power supply system 62 in accordance with an embodiment of the present invention. Electric power supply system 62 may include a non-renewable energy source 201, which in a preferred embodiment is a grid connected to a power plant, a renewable energy source 202, for example a solar, wind or cogeneration source, and bank 210 of one of more rechargeable charging batteries 220. In preferred embodiments, each rechargeable charging battery 220 is configured in the same manner as battery 30a or battery 30b, but with substantially more cells. It should be noted that charging battery 220 and onboard vehicle battery 30 may be the same type of battery chemistry or different battery chemistries. Source 201, source 202 or battery bank 210 may be alternately be used to provide electricity to onboard vehicle battery 30 via electrical supply line 68a of recharging station 60 (FIG. 1). Battery bank 210 may also be used to provide electricity to onboard vehicle battery 30, in the event of failure of sources 201, 202, for example due to an emergency, or based on other conditions as determined by an electricity management system, which may be included in controller 70 or an additional controller. For example, during off peak power consumption periods, battery 220 may be connected to one of sources 201, 202 to rapidly recharge battery 220 as directed by controller 70 or manually. Temperature management system 64 may allow for battery 220 to be charged at high rates by sources 201, 202 by supplying heat exchange fluid to channels 34 (FIG. 2) or channels 135 (FIG. 3b) of battery 220 as sources 201, 202 charge battery 220. Controller 70 may control the rate of heat exchange fluid supply from temperature management system 64 to battery 220, the rate of charging of battery 220 by sources 201, 202 and whether source 201, source 202 or battery 220 is supplying electricity to onboard electric vehicle battery 30.

In other embodiments, electric power supply system 62 of rapid charging station 60, when used in areas where source 201 is not equipped for ultra-rapid rate recharging, source 201 may more slowly charge battery bank 210, then battery bank 210 may ultra-rapidly recharge onboard electric vehicle battery 30, preventing source 201 from being exposed to the stress caused by high rate recharging. In one such embodiment, electric power supply system 62 is controlled by controller 70 such that source 201 is solely used in recharging station 60 to charge battery bank 210, and not to recharge onboard vehicle batteries 30. In another embodiment, source 201 may be used for lower rate charging of onboard electric vehicle batteries 30 than battery bank 210. Electric power supply system 62 may be operated by controller 70 to charge only some of batteries 220 of bank 210, and other of batteries 220 at other times. For example, a first group of batteries 220A may be discharged to rapidly recharge an onboard electric vehicle battery 30, while another group of batteries 220B is being more slowly recharged by source 201. Next, after the first group of batteries 220A finishes rapidly recharging onboard electric vehicle battery 30, source 201 may resume recharging all of batteries 220A, 220B together, or recharging those batteries 220A or 220B with the lowest remaining charge.

For one exemplary embodiment where source 201 is the grid, source 201 may recharge a first group of batteries 220A of battery bank 210 at powers of less than 100 kW, while a second group of batteries 220B of battery bank 210 recharge onboard vehicle batteries 30 at powers of greater than 100 kW. Once the second group of batteries 220B are sufficiently depleted and the first group of batteries 220A have been recharged to a certain level, controller 70 may uncouple the second group of batteries 220B from line 68a for recharging onboard vehicle batteries 30 and couple the second group of batteries 220 to source 201 for recharging the second group of batteries 220B; and uncouple the first group of batteries 220A from source 201 and couple the first group of batteries 220A to line 68a for recharging onboard vehicle batteries 30.

In other embodiments where rapid charging station 60 is used in areas where source 201 is not equipped for ultra-rapid rate recharging, source 201 may be used to recharge both batteries 220 of battery bank 210 and onboard vehicle batteries 30 at rates below those used for ultra-rapid rate recharging. The rate of charging by source 201 may depend on whether the area serviced by source 201 is experiencing peak or off peak electricity consumption. Accordingly, the rate of charging by source 201 of battery bank 210 or onboard vehicle batteries 30 may be in a first power range during peak consumption and in a second power range, which is greater than the first power range, during electricity consumption. For one exemplary embodiment where source 201 is the grid, source 201 may recharge batteries 220 of battery bank 210 or onboard vehicle batteries 30 at powers of less than 40 kW during times of peak electricity consumption and recharge batteries 220 of battery bank 210 or onboard vehicle batteries 30 at powers of between 40 kW than 100 kW during times of off peak electricity consumption. Controller 70 may control whether source 201, source 202 or battery bank 210 is used for recharging batteries 30 and whether heat exchange fluid is provided to particular batteries 30 (and also for example the rate and temperature of the heat exchange fluid) based on information provided to controller 70 by RFID tag reader 77 (FIG. 1). The decision on whether source 201, source 202 or battery bank 210 is used for recharging batteries 30 may also take into account whether the area serviced by source 201 is experiencing peak or off peak electricity consumption. For one example, if RFID tag 79 (FIG. 1) indicates to RFID tag reader 77 that battery 30 is preferably ultra-rapidly recharged, controller 70 directs electric power supply system 62 to ultra-rapidly recharge battery 30 with battery bank 210 and directs temperature management system 64 to provide heat exchange fluid (at a predetermined temperature and/or rate) to battery 30. Controller 70, in response to the information from RFID tag reader 70, may also generate options for either ultra-rapid recharging or fast recharging to be displayed and selected by the vehicle user via touchscreen 71.

For another example, if RFID tag 79 (FIG. 1) indicates to RFID tag reader 77 that battery 30 is not capable ultra-rapidly recharging, controller 70 directs electric power supply system 62 to perform a fast recharge of battery 30 with either battery bank 210 or source 201. Whether battery bank 210 or source 201 is selected may depend on the desired rate of recharging of battery 30 (e.g., maximum rate that battery 30 can be recharged safely and effectively recharged) as indicated by RFID tag 79 and whether source 201 is experiencing peak or off peak electricity consumption, including the maximum power that source 201 can be used for charging without failure or disruption. If tag 79 for example specifies that battery 30 has a desired charging rate of between 30 kW and 40 kW and source 201 is experiencing off peak electricity consumption, during a time in which source 201 can be used for recharging up to 100 kW without failure or disruption, controller 70 may direct electric power supply system 62 to recharge battery 30 using source 201. If tag 79 for example specifies that battery 30 has a desired charging rate of between 80 kW and 100 kW and source 201 is experiencing peak electricity consumption, during a time in which source 201 can only be used for recharging up to 40 kW without failure or disruption, controller 70 may direct electric power supply system 62 to recharge battery 30 using battery bank 210

Battery bank 210 may serve dual purposes of being used as a backup in the event of emergencies, and on a daily basis storing also for reducing peak power usage from the grid, thereby also reducing risks of capacity overload and reducing operating costs. Electric power supply system 62 may also be controlled by controller to sell power from batteries 220 to the grid in situation where it is economically advantageous.

In brief, the application of battery bank 210 enables unique functionality and value on a cross-systems basis. Rather than backup batteries that are single purpose and solely for emergencies, the rechargeable charging batteries described herein are applied for greater economic and national security productivity. For example, the rechargeable charging batteries may provide a daily return on investment by enabling banking an utilization of electrical energy which takes advantage of electrical re-charging at high rates during lower cost (off peak) periods and allowing electrical devices grid-independent energy via the rechargeable charging batteries during otherwise higher cost (peak) periods.

The electricity management system may include data inputs and dynamic management models in accord with a variety of considerations. For example, these parameters may include economic and operational parameters for the site, as well as more broadly for the surrounding area and region. Such decision management and decision making for example may be supported by an intelligent management system with data inputs ranging from weather and real-time operating conditions, to secure military and homeland security parameters on the needs for emergency readiness.

The advantages of such an approach may be considerable. Present practices may leave backup batteries to remain as unproductive or idle capital equipment except for emergencies; instead, according to the embodiments of the present invention the rechargeable charging batteries may be used for daily recharging of onboard electric vehicle batteries 30.

As noted above, a primary benefit may occur by using the stored power to help balance loads and reduce operating costs—e.g., by charging at night when demand and cost is low and using the stored power to reduce use of the grid during peak periods when demand and price is high. There are other important benefits as described below.

The rechargeable charging batteries provide unique characteristics because there is substantial flexibility in their operating parameters and flexibility for deployment. The system may be operated under common control, where management system, geographic/site specific logistical data and risk management models/parameters collectively or individually may be used as inputs and to help drive output decisions—i.e., in determining the optimal balance of residual charged capacity (i.e., how much to retain on-hand for emergencies in each unit or across a network of units.) For example, 20% capacity may be kept charged at all times for emergency needs and 80% may be actively cycled on a daily basis. Additionally, real time information on demand frequency inputs for the user and/or for the available grid may be used to maintain and manage the best charge/ discharge scenarios dynamically as needed. A dynamic model may be used to optimize such usage.

At times of greater need, such as a high national alert or pending major storm, the batteries 220 of bank 210 may be rapidly recharged and maintained at 100% charge readiness unless/until sources 201, 202 are unable to charge onboard vehicle batteries 30.

Among other advantages, dynamic modeling and networking in cooperation with utility companies may help to implement real-time decisions for charging the systems back to full capacity. By distributing such nodes, other benefits may include supporting public utilities in keeping voltage and frequency stable and provide spinning reserves (meet sudden demands for power).

Among additional benefits, this technology and approach may provide a buffer for integration of renewable power such as wave, wind power, or solar by storing excess energy produced during optimal periods and putting it to utilization during other periods when the most valuable. This may help to stabilize unpredictable aspects of renewable energy.

Additional advantages may include the ability to enable movable nodes to be used across a range of different volumes and capabilities. These nodes or energy banks may be comprised of moveable and non-moveable units including backup batteries, which may be batteries 30a (FIG. 2) or batteries 30b (FIGS. 3a, 3b), that may be provided to the recharging stations in the event that sources 201, 202 are down for a prolonged period of time and the energy of batteries 220 is depleted. The backup batteries of the movable nodes may be connected to recharging stations 60 in such emergency situations. For instance, sizes of such units and their weight may be configured as standard moveable units—for example packaged in standard shipping container-sized housing which is trailerable on most roadways. Other modules may be sized for "carry on" for other portability.

The movable nodes may be extensively scalable for different types and scales of applications, for example:

(A) a standard single shipping container comprising 1172 cubic feet, 30,000 lbs, providing 1 Mega Watt hour;
(B) a "carry on sized" valise on wheels, 50-200 lbs, providing 7-30 KiloWattHr; and
(C) a network of 100 standard single shipping containers on trailer wheels, comprising 1172 cubic feet each, 30,000 lbs each, providing cumulative 100 Megawatt hrs.

Figure 5:
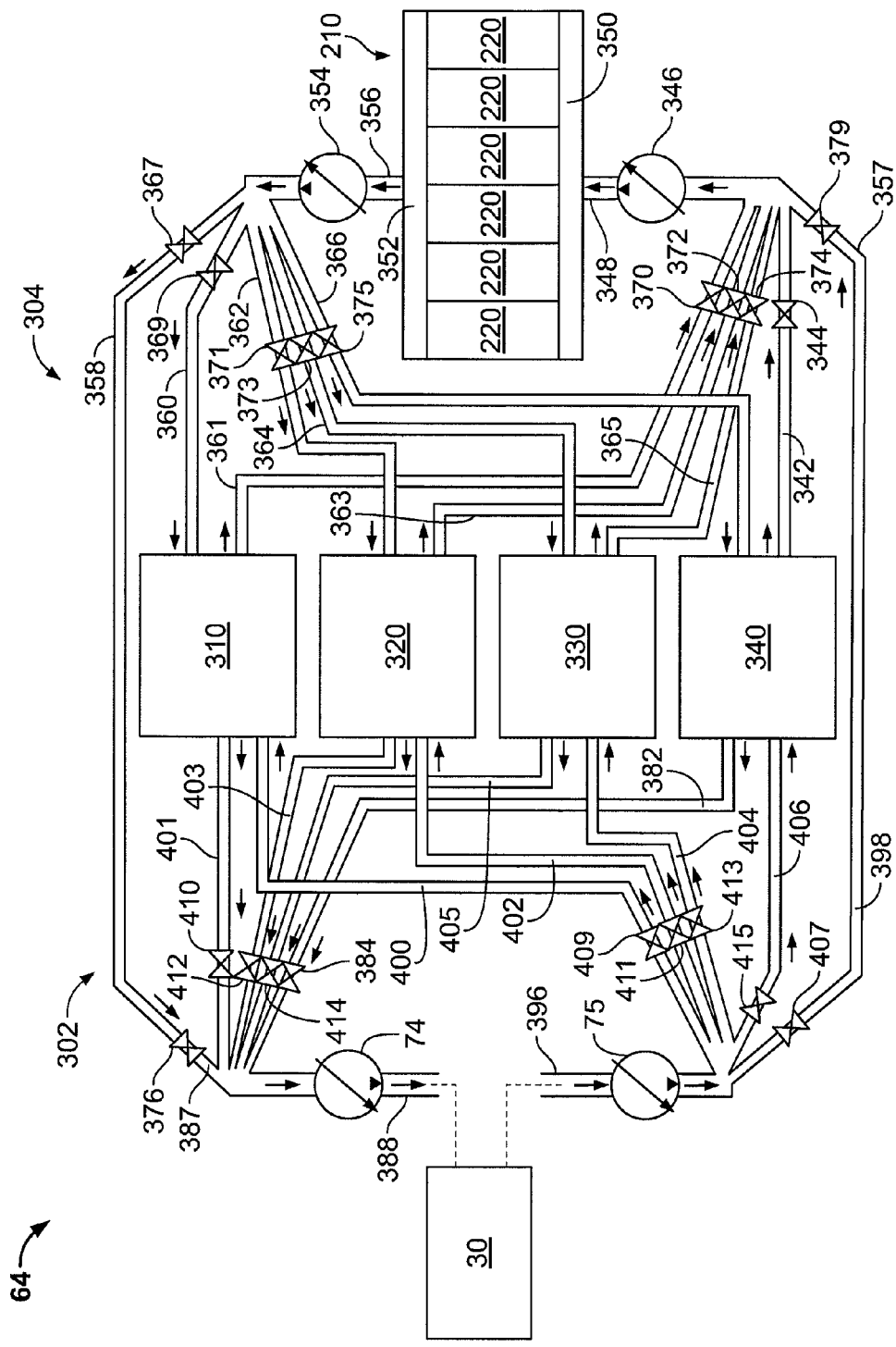
FIG. 5 schematically shows temperature management system in accordance with an embodiment of the present invention.

FIG. 5 schematically shows temperature management system 64 in accordance with an embodiment of the present invention. Temperature management system provides heat exchange fluid to both onboard electric vehicle battery 30 and battery bank 220 to thermally condition onboard electric vehicle battery 30 and battery bank 220. In other words, temperature management system 64 controls the temperature of both battery 30 and batteries 220, cooling and heating batteries 30, 220 as desired by the situation and ambient temperature conditions. A first section or onboard electric vehicle battery heat exchange section 302 provides heat exchange fluid to onboard electric vehicle battery 30 and a second section or charging batter heat exchange section 304 provides heat exchange fluid to batteries 220 of bank 210. Temperature management system 64 includes a cooler 310 that may include for example a refrigeration unit for cooling heat exchange fluid when heat exchange fluid is used to cool batteries 30, 220 and a heater 320 for heating heat exchange fluid when heat exchange fluid is used to heat batteries 30, 220. Temperature management system 64 may also include a heat exchanger 330, which allows the heat exchange fluid used to control the temperature of battery 30 to exchange heat with the heat exchange fluid used to control the temperatures of batteries 220 in bank 210.

As shown in FIG. 5, a heat exchange fluid source 340 may be provided for providing heat exchange fluid to battery bank 210 via a source line 342, flow through which is regulated by a valve 344, and for providing heat exchange fluid to battery 30 via a source line 382, flow through which is regulated by a valve 384. An inlet pump 346 may be provided upstream of battery bank 210 in an inlet line 348 for providing heat exchange fluid to battery bank 210 to deliver heat exchange fluid for heating or cooling batteries 220. Battery bank 210 may include an inlet manifold 350 and an outlet manifold 352 such that heat exchange fluid can be passed through the channels of batteries 220 in parallel. Pump 74 may also be provided in an outlet line 388 of first section 304 for delivering heat exchange fluid to battery 30 (via line 68b and inflow section 94 as described above) for heating or cooling battery 30.

Downstream of battery bank 210, an outlet pump 354 in an outlet line 356 of battery bank 210 pumps heat exchange fluid away from battery bank 210. A plurality of lines 358, 360, 362, 364, 366 may be provided downstream of pump 354. Line 358 allows heat exchange fluid exiting battery bank 210 to be provided directly from second section 304 to first section 302 for delivery to battery 30. Line 358 may be connected to a line 387 for providing heat exchange fluid to line 388. Line 360 allows heat exchange fluid exiting battery bank 210 to be provided to cooler 310 for cooling. After being cooled by cooler 310, the cooled heat exchange fluid is passed to a line 361 for delivery back into battery bank 210. Line 362 allows heat exchange fluid exiting battery bank 210 to be provided to heater 320 for heating. After being heated by heater 320, the heated heat exchange fluid is passed to a line 363 for delivery back into battery bank 210. Line 364 allows heat exchange fluid exiting battery bank 210 to be provided to heat exchanger 330 for exchanging heat with heat transfer fluid in first section 302. After being heated or cooled in heat exchanger 330, the heat exchange fluid is passed to a line 365 for delivery back into battery bank 210. Line 366 allows heat exchange fluid exiting battery bank 210 to be provided back into coolant source 340. Lines 342, 358, 360, 361, 362, 363, 364, 365, 366, 387 include respective valves 344, 367, 369, 370, 371, 372, 373, 374, 375, 376 that are controlled by controller 70.

Similarly, downstream of battery 30, return pump 75 in a return line 396 of first section 302 pumps heat exchange fluid away from battery 30. A plurality of lines 398, 400, 402, 404, 406 may be provided downstream of pump 75. Line 398 allows heat exchange fluid exiting battery bank 210 to be provided directly from first section 302 to second section 304 for delivery to battery bank 210. Line 388 may be connected to a line 357 for providing heat exchange fluid to line 348. Line 400 allows heat exchange fluid exiting battery 30 to be provided to cooler 310 for cooling. After being cooled by cooler 310, the cooled heat exchange fluid is passed to a line 401 for delivery back into battery 30. Line 402 allows heat exchange fluid exiting battery 30 to be provided to heater 320 for heating. After being heated by heater 320, the heated heat exchange fluid is passed to a line 403 for delivery back into battery 30. Line 404 allows heat exchange fluid exiting battery 30 to be provided to heat exchanger 330 for exchanging heat with heat transfer fluid in second section 304. After being heated or cooled in heat exchanger 330, the heat exchange fluid is passed to a line 405 for delivery back into battery 30. Line 406 allows heat exchange fluid exiting battery bank 210 to be provided back into coolant source 340. Lines 357, 382, 398, 400, 401, 402, 403, 404, 405, 406 include respective valves 379, 384, 407, 409, 410, 411, 412, 413, 414, 415 that are controlled by controller 70. Controller 70 controls the valves of both sections 302, 304 to achieve an optimal temperature in battery 30 and batteries 220 in the most cost effective manner.

Controller 70 may receive inputs from sensors within battery 30 and batteries 220 and increases or decreases the pumping rate of pumps 74, 75, 346, 354 and/or the amount of heat supplied to or removed from the fluid by devices 310, 320, 330 or the direct exchange between sections 302, 304 to keep the temperature of batteries 30, 220 at an optimum temperature.

As described above, heat transfer fluid may be exchanged between heat exchange sections 302, 304. For example, heat exchange fluid exiting battery 30 may be supplied to battery bank 210, either directly, or by passing the heat exchange fluid exiting battery 30 through one of cooler 310 or heater 320, then to battery bank 210. For passing the heat exchange fluid exiting battery 30 through cooler 310 to battery bank 210, cooler 310 may include valves, which are controlled by controller 70, to provide heat exchange fluid in line 400 to line 361. For passing the heat exchange fluid exiting battery 30 through heater 320 to battery bank 210, heater 320 may include valves, which are controlled by controller 70, to provide heat exchange fluid in line 402 to line 363. Heat exchange fluid exiting battery bank 210 may also be supplied to battery 30, either directly, or by passing the heat exchange fluid exiting battery bank 210 through one of cooler 310 or heater 320, then to battery 30. For passing the heat exchange fluid exiting battery bank 210 through cooler 310 to battery 30, cooler 310 may include valves, which are controlled by controller 70, to provide heat exchange fluid in line 360 to line 401. For passing the heat exchange fluid exiting battery bank 210 through heater 320 to battery 30, heater 320 may include valves, which are controlled by controller 70, to provide heat exchange fluid in line 362 to line 403.

The exchange of heat transfer fluid between heat exchange sections 302, 304 may be performed when one of battery bank 210 and battery 30 is being heated and the other of battery bank 210 and battery 30 is being cooled. For example, if battery bank 210 is below a desired temperature range for discharging and needs to be heated before discharging to recharge battery 30, and battery 30 is being cooled, the heat exchange fluid exiting battery bank 30, which absorbed heat from battery 30 to cool battery 30, may be sufficiently warm to heat battery bank 210 to the desired temperature range for discharging. Additionally, the reverse situation may be applied, where heat exchange fluid being used to heat one of battery 30 and battery bank 210 may be supplied directly to the other of battery 30 and bank 210 for cooling. If the heat exchange fluid exiting one of battery 30 and bank 210 is not sufficiently cool or warm to cool or heat the other of battery 30 and 210, the heat exchange fluid may passed through cooler 310 or heater 320 before being provided to the other of battery 30 and bank 210.

Batteries 220 may need to be heated during discharge (i.e., when batteries 220 are supplying electricity through line 68a (FIG. 1) to recharge a battery 30) for optimal performance. For example, for numerous embodiment of batteries 220, including batteries 30a, 30b, heating batteries 220 during discharge may prevent dendrite formation. Additionally, batteries 30b may need to operated at elevated temperatures (above for example 60° C., 140° F.) in order to sustain optimal ionic conductivity of the solid polymer electrolytes. In order to heat batteries 220 during discharge, heat exchange fluid that has absorbed heat from battery 30 to cool battery 30 during recharging may be supplied to battery bank 210, either directly, or by passing the heat exchange fluid exiting battery 30 through heater 320, then to battery bank 210. Also, heat exchange fluid that has absorbed heat from battery 30 to cool battery 30 during recharging may be passed through heat exchanger 330 in first section 302 to heat exchange fluid in second section 304, which is then provided to battery bank 210 to heat batteries 220. In embodiments where batteries 220 are batteries 30b (FIGS. 3a, 3b), batteries 220 may be heated by heat exchange fluid during the discharging or charging of batteries 220 to keep the temperature of cells 110 (FIG. 3c) at or above 60° C. at all times during such discharging. During the discharging or charging of batteries 220, the temperature is also kept below at or below 180° C. and in preferred embodiments using batteries 30b, at or below 80° C. In alternative embodiments, the maximum temperature may be greater than 180° C., for example, where the materials used for batteries 220 have melting points greater than 180° C. Batteries 30 may be similarly heated and cooled. For example, in cold weather, batteries may be first heated, so they accept charge, and then cooled as the temperature of batteries 30 rise. Vehicle 20 may also include an onboard temperature management system for heating batteries for charging that may communicate with controller 70 via controller 28.

Heat exchange fluid supplied by temperature management system 64 may be oil, water or air. For example, flowable liquid or gaseous materials having optimal heat capacity may be used. The heat exchange fluid may be supplied with additives to increase heat exchange capabilities. In one preferred embodiment, the heat exchange fluid is electrically insulating. In one preferred embodiment, the heat exchange fluid is a commercial heat-transfer fluid, Paratherm LR, a paraffinic hydrocarbon with a broad operating range (i.e., between −50 and 230 degrees Celsius).

Figure 6:
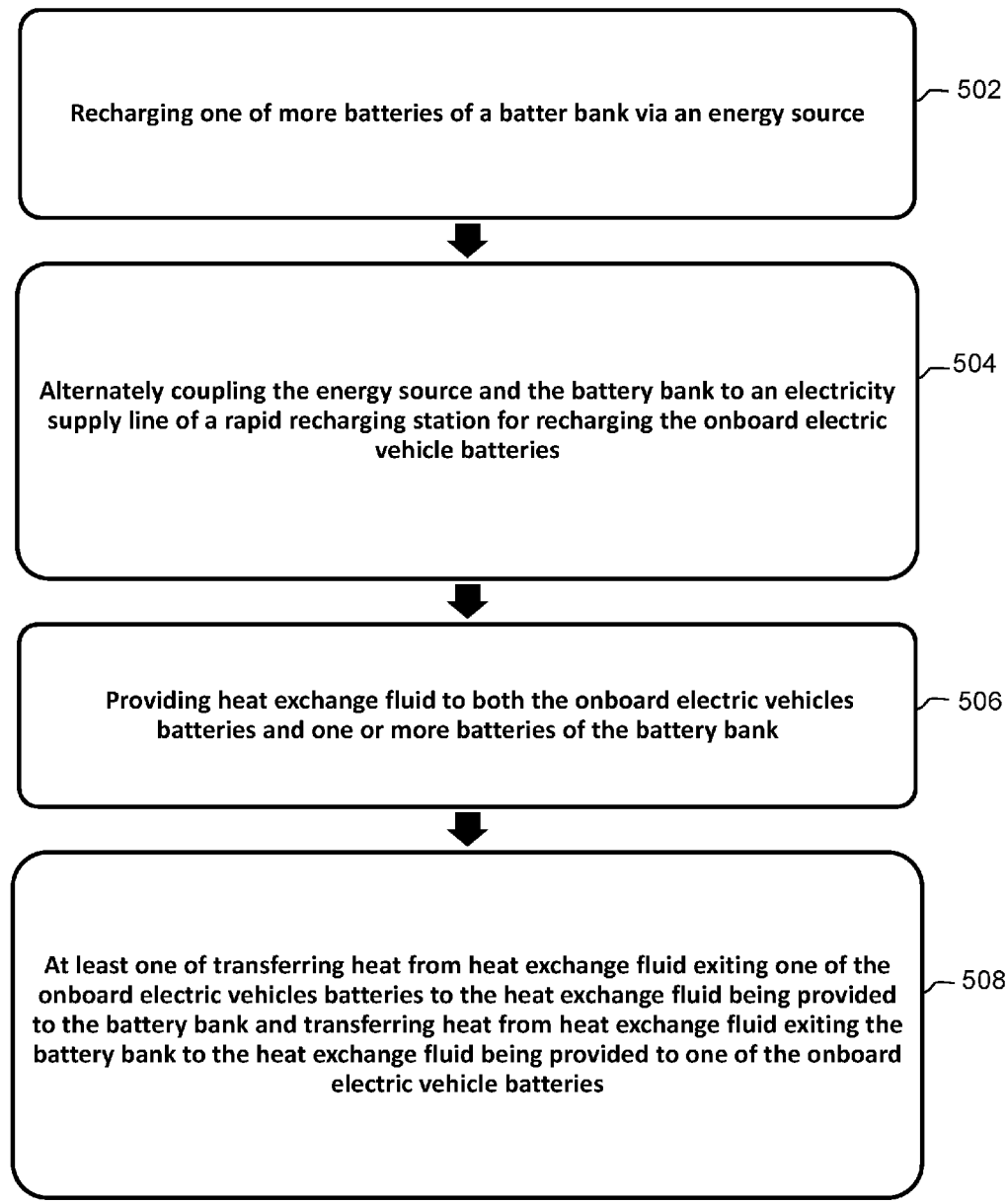
FIG. 6 shows a flow chart illustrating a method in accordance with an embodiment of the present invention.

FIG. 6 shows a method 500 of recharging onboard electric vehicle batteries in accordance with an embodiment of the present invention. Method 500 includes a step 502 of recharging one or more batteries of a battery bank via an energy source, a step 504 of alternately coupling the energy source and the battery bank to an electricity supply line of a rapid recharging station for recharging the onboard electric vehicle batteries, a step 506 of providing heat exchange fluid to both the onboard electric vehicles batteries and one or more batteries of the battery bank; and a step 508 of at least one of transferring heat from heat exchange fluid exiting one of the onboard electric vehicles batteries to the heat exchange fluid being provided to the battery bank and transferring heat from heat exchange fluid exiting the battery bank to the heat exchange fluid being provided to one of the onboard electric vehicle batteries.

Method 500 can also include cooling the heat exchange fluid provided to both the onboard electric vehicles batteries and one or more batteries of the battery bank.

Method 500 can include heating the heat exchange fluid provided to both the onboard electric vehicles batteries and one or more batteries of the battery bank.

Step 504 can include supplying electricity to onboard electric vehicle battery from the battery bank during a peak period of demand of the power grid and supplying electricity to onboard electric vehicle battery from the power grid during an off-peak period of demand of the power grid.

Step 502 may be performed during the off-peak period of demand of the power grid.

The heat exchange fluid can be liquid and can be delivered to channels within the onboard electric vehicles batteries and channels within the one or more batteries of the battery bank.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. An electric vehicle recharging station comprising:
   an electric power supply system for rapidly recharging an onboard electric vehicle battery, the electric power supply system comprising a first energy source and a battery bank including one or more rechargeable charging batteries for rapidly recharging the onboard electric vehicle battery; and
   a temperature management system providing heat exchange liquid to both the onboard electric vehicle battery and the battery bank to thermally condition the onboard electric vehicle battery and the battery bank, the temperature management system being configured for heating one of the onboard electric vehicle battery and the battery bank while cooling the other of the onboard electric vehicle battery and the battery bank.

2. The electric vehicle recharging station as recited in claim 1 wherein the temperature management system includes a first section for providing heat exchange liquid to the onboard electric vehicle battery and a second section for providing heat exchange liquid to the battery bank.

3. The electric vehicle recharging station as recited in claim 2 wherein the temperature management system includes a cooler for cooling the heat exchange liquid of the first section and the second section.

4. The electric vehicle recharging station as recited in claim 2 wherein the temperature management system includes a heater for heating the heat exchange liquid of the first section and the second section.

5. The electric vehicle recharging station as recited in claim 2 wherein the temperature management system includes a heat exchanger for heat exchange between the first section and the second section.

6. The electric vehicle recharging station as recited in claim 2 wherein the heat transfer liquid is transferred between the first second and the second section.

7. The electric vehicle recharging station as recited in claim 6 wherein the heat exchange liquid exiting the onboard electric vehicle battery is supplied to the battery bank.

8. The electric vehicle recharging station as recited in claim 6 wherein the heat exchange liquid exiting the battery bank is supplied to the onboard electric vehicle battery.

9. The electric vehicle recharging station as recited in claim 1 further comprising a controller, the first energy source including a power grid, the controller controlling the supply of electricity such that the battery bank supplies energy to the onboard electric vehicle battery during a peak period of demand of the power grid and the power grid supplies energy to the onboard electric vehicle battery during an off-peak period of demand of the power grid.

10. The electric vehicle recharging station as recited in claim 9 wherein the controller directs electricity from the power grid to the battery bank during the off-peak period of demand of the power grid.

11. The electric vehicle recharging station as recited in claim 9 wherein the first energy source further includes a renewable energy source.

12. The electric vehicle recharging station as recited in claim 9 wherein the controller selectively controls the one or more rechargeable charging batteries and the at least one energy source such that both the one or more rechargeable charging batteries and the at least one energy source supply energy to the plurality of electrically powered devices on a daily basis.

13. A method of recharging onboard electric vehicle batteries comprising:
   recharging one or more batteries of a battery bank via an energy source;
   alternately coupling the energy source and the battery bank to an electricity supply line of a rapid recharging station for recharging the onboard electric vehicle batteries;
   providing heat exchange liquid to both the onboard electric vehicles batteries and one or more batteries of the battery bank; and
   at least one of transferring heat from heat exchange liquid exiting one of the onboard electric vehicles batteries to the heat exchange liquid being provided to the battery bank and transferring heat from heat exchange liquid exiting the battery bank to the heat exchange fluid being provided to one of the onboard electric vehicle batteries.

14. The method as recited in claim 13 further comprising cooling the heat exchange liquid provided to both the onboard electric vehicles batteries and one or more batteries of the battery bank.

15. The method as recited in claim 13 further comprising heating the heat exchange liquid provided to both the onboard electric vehicles batteries and one or more batteries of the battery bank.

16. The method as recited in claim 13 wherein the alternately coupling the energy source and the battery bank to the electricity supply line of the rapid recharging station includes supplying electricity to onboard electric vehicle battery from the battery bank during a peak period of demand of the power grid and supplying electricity to onboard electric vehicle battery from the power grid during an off-peak period of demand of the power grid.

17. The method as recited in claim 13 wherein the recharging one or more batteries of a battery bank via an energy source is performed during the off-peak period of demand of the power grid.

18. The method as recited in claim 13 wherein the heat exchange liquid is liquid and is delivered to channels within the onboard electric vehicles batteries and channels within the one or more batteries of the battery bank.

19. An electric vehicle recharging station comprising:
   an electric power supply system comprising a first energy source and a battery bank including one or more rechargeable charging batteries, the first energy source recharging the battery bank at a first power, the battery bank recharging onboard electric vehicle batteries at a second power greater than the first power such that the first energy source is prevented from being exposed to the stress of discharging at the second power; and
   a temperature management system providing heat exchange liquid to both the onboard electric vehicle battery and the battery bank to thermally condition both the onboard electric vehicle battery and the battery bank, the temperature management system being configured for heating the battery bank and cooling at least one of the onboard electric vehicle batteries while the battery bank recharges the at least one onboard electric vehicle battery.

20. The electric vehicle recharging station as recited in claim 19 wherein the first energy source is solely used in electric vehicle recharging station to recharge the battery bank, and not to recharge the onboard electric vehicle batteries.

\* \* \* \* \*